US009929870B2

(12) United States Patent
Calzone

(10) Patent No.: US 9,929,870 B2
(45) Date of Patent: Mar. 27, 2018

(54) CONDITIONAL ACCESS NETWORK HANDLER EMULATOR

(75) Inventor: Steven J. Calzone, Duluth, GA (US)

(73) Assignee: Cox Communications, Inc., Atlanta, GA (US)

( * ) Notice: Subject to any disclaimer, the term of this patent is extended or adjusted under 35 U.S.C. 154(b) by 1771 days.

(21) Appl. No.: 13/011,617

(22) Filed: Jan. 21, 2011

(65) Prior Publication Data
US 2011/0179443 A1    Jul. 21, 2011

Related U.S. Application Data

(60) Provisional application No. 61/296,972, filed on Jan. 21, 2010.

(51) Int. Cl.
H04N 7/16    (2011.01)
H04L 12/28   (2006.01)

(52) U.S. Cl.
CPC ................. H04L 12/2801 (2013.01)

(58) Field of Classification Search
CPC .......... H04N 21/4223; H04N 21/4181; H04N 21/4405; H04N 21/2541; H04N 21/4437
USPC .................................... 725/132, 28
See application file for complete search history.

(56) References Cited

U.S. PATENT DOCUMENTS

2001/0049594 A1* 12/2001 Klevans ...................... 703/14
2004/0049797 A1*  3/2004 Salmonsen ................. 725/132
2004/0261114 A1* 12/2004 Addington .......... H04L 41/5051
                                                    725/106
2006/0101495 A1*  5/2006 Yoshida et al. ............... 725/78
2006/0259984 A1* 11/2006 Juneau ........................... 726/28
2009/0077271 A1*  3/2009 Kaag ....................... H04N 5/445
                                                    710/10
2009/0300578 A1* 12/2009 Neil ............................. 717/104
2010/0023198 A1*  1/2010 Hamilton ..................... 701/29
2010/0064324 A1*  3/2010 Jenkin .................. H04N 21/443
                                                    725/59
2011/0112930 A1*  5/2011 Piepenbrink et al. ...... 705/26.25
2011/0126244 A1*  5/2011 Hasek ........................... 725/87
2013/0152145 A1*  6/2013 Karunakaran ....... H04N 21/443
                                                    725/109

OTHER PUBLICATIONS

A/53: ATSC Digital Television Standard, Parts 1-6, 2007, Advanced Television Systems Committee, Inc., 136 pages (Jan. 3, 2007).
ANSI/SCTE 41 2011, POD Copy Protection System, Society of Cable Telecommunications Engineers, Inc., 77 pages (Copyright 2011).

(Continued)

Primary Examiner — Fernando Alcon
(74) Attorney, Agent, or Firm — Merchant & Gould P.C.

(57) ABSTRACT

Methods and systems for emulating cable services delivery are disclosed. One system includes a conditional access network handler emulator comprising a conditional access network handler simulator addressable by one or more applications within an emulation environment. The conditional access network handler emulator also includes a library of conditional access configuration data accessible to a conditional access network handler simulator, the configuration data unassociated with a physical cable card.

22 Claims, 6 Drawing Sheets

(56) References Cited

OTHER PUBLICATIONS

CableCARD ™ Copy Protection 2.0 Specification, OC-SP-CCCP2.0-I08-071113, Cable Television Laboratories, Inc., 71 pages (Nov. 13, 2007).
CableCARD Interface 2.0 Specification, OC-SP-CCIF2.0-I16-081114, Cable Television Laboratories, Inc., 325 pages (Nov. 14, 2008).
Digital Video Broadcasting (DVB); Multimedia Home Platform (MHP) Specificaion 1.1.1, ETSI TS 102 812 V1.2.2, ETSI, 1086 pages (Aug. 2006).
OpenCable ™ Application Platform Specification, OCAP 1.0 Profile, OC-SP-OCAP1.0-I16-050803, Cable Television Laboratories, Inc., 626 pages (Aug. 3, 2005).
OpenCable Host Device 2.1 Core Functional Requirements, OC-SP-HOST2.1-CFR-I06-081114, Cable Television Laboratories, Inc., 120 pages (Nov. 14, 2008).

\* cited by examiner

CONDITIONAL ACCESS NETWORK HANDLER EMULATOR

CROSS REFERENCE TO RELATED APPLICATIONS

The present application claims priority to U.S. Provisional Patent Application No. 61/296,972 filed Jan. 21, 2010, the disclosure of which is hereby incorporated by reference in its entirety.

BACKGROUND

In an OpenCable Application Platform (OCAP), Conditional Access (CA) is controlled by a hardware device called a cable card. The cable card stores the list of entitlements for a subscriber. These entitlements control access to premium subscription channels (e.g., HBO, Cinemax, etc.) pay-per-view (PPV) services, and system resources such as the hard disk drive used for digital video recording (DVR).

Although OCAP provides a generic way for applications to communicate with the cable card via Specific Application Support (SUS) tunnels, it does not specify the format or semantics of the messages, which are unique to each cable card manufacturer. In order to allow applications to operate with a variety of CA systems, the manufacturer of the cable cards also supplies a library called the Conditional Access Network Handler (CANH).

The Application Programming Interfaces (APIs) through which an application talks to the CANH are defined as part of the OpenCable family of specifications. The API specification for a CANH is technically independent from the OCAP specification, although all cable operators are required to download and make this library available to privileged applications at run time. An example of such an arrangement is illustrated in FIG. 1.

In a physical deployment of a cable environment, the CANH and its associated library of functions published at the CANH API is initialized by a Monitor application, which is a privileged application that is created and downloaded by the cable operator. After initialization, the CANH library is accessible to other applications that wish to make use of it, such as the program guide or navigator application.

It is a desire to have an OCAP Application Development Environment which allows engineers to develop and test applications, such as the monitor applications without access to a head-end or cable card. Currently, there are two problems which prevent this from occurring:

First, existing applications rely on a CANH library to query various system and program entitlements. However, available CANH libraries are tied to specific models of physical cable cards. Currently deployed OCAP emulators do not have a cable card present; therefore, applications cannot run in those simulation environments.

Secondly, OCAP set-top devices have not historically been able to operate without both a cable cards and head-end present. Even though more recent firmware releases have made operation possible absent a head-end, the absence of the cable cards still prevents applications executing at the set-top device from properly executing.

It is with respect to these and other considerations that the present invention has been made.

SUMMARY

In accordance with the following disclosure, the above and other issues are addressed by the following:

In a first aspect, a conditional access network handler emulator includes a conditional access network handler simulator addressable by one or more applications within an emulation environment. The conditional access network handler emulator includes a library of conditional access configuration data accessible to a conditional access network handler simulator, the configuration data unassociated with a physical cable card.

In a second aspect, a conditional access cable programming application development environment includes an application under development, a cable access entitlement manager, and an emulation environment. The emulation environment includes a conditional access network handler emulator system addressable by the application, the emulation environment capable of loading the application and linking the application to the conditional access network handler emulator system and the cable access entitlement manager. The conditional access network handler emulator system includes a library of conditional access configuration data accessible to a conditional access network handler simulator, the configuration data unassociated with a physical cable card.

In a third aspect, a method of testing an application intended for use on host hardware configured to deliver conditional access cable programming is disclosed. The method includes instantiating an emulation environment including a conditional access network handler emulator, the conditional access network handler emulator including a library of conditional access configuration data unassociated with a physical cable card. The method further includes configuring connection information in an entitlement manager to operate in conjunction with an emulation environment, the entitlement manager simulating a head-end of a cable services delivery network. The method also includes loading a conditional access application under development in the emulation environment, the conditional access application configured to address the access network handler emulator to determine access rights to services in the cable services delivery network in the absence of a cable card, and simulating operation of the conditional access application.

DETAILED DESCRIPTION

Figure 1:
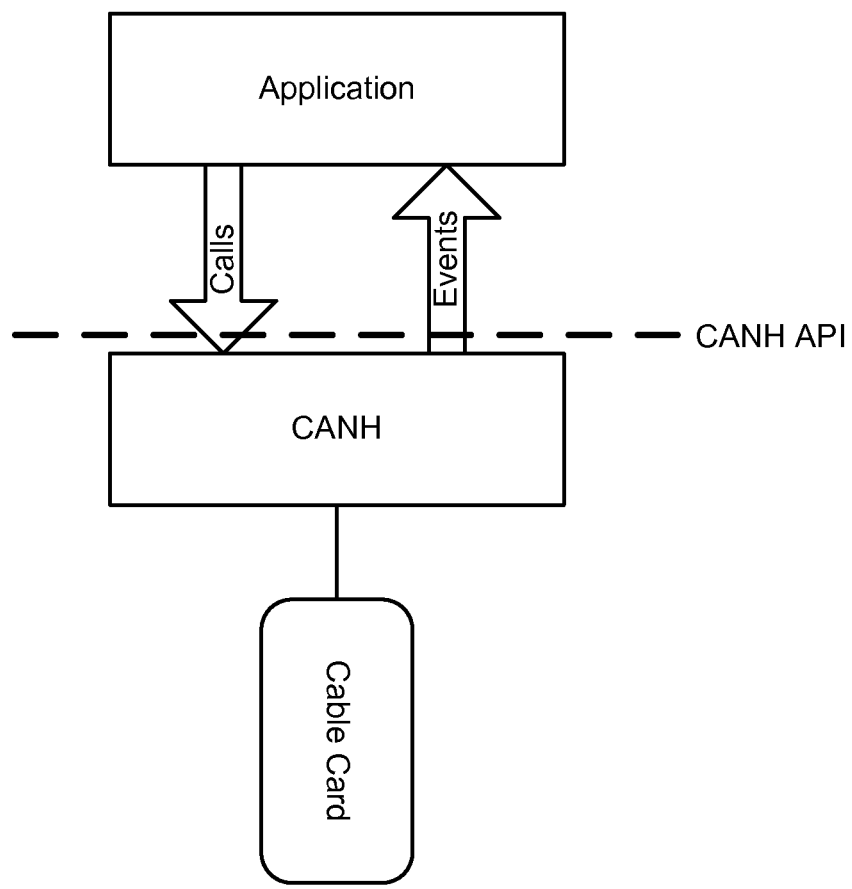
FIG. 1 is a logical diagram of a conditional access network handler interfaced to an application.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to a conditional access network handler (CANH) emulator, and an overall development and simulation environment in which such an emulator may reside. Generally, the CANH emulator provides functionality expected by applications dependent on compatibility with the CANH API, without requiring the presence of a cable card, head-end, or network. This emulation system will enable the development of complex applications on OCAP emulators or developer set-tops which do not otherwise have a cable card present. Rather, the CANH emulator operates in conjunction with and interfaces to a simulation of expected entitlement tracking functionality of the cable card. This simulation can represent a true simulation of a live, networked system, in that applications developed using the CANH emulator of the present disclosure can operate live on set-top hardware or on other systems having a physical cable card. In certain embodiments, such applications would work analogously on systems using physical or software cable card accessibility without any change to the application itself. Therefore, embodiments of the CANH emulator described by this document can advantageously be used during application development in conjunction with a set-top emulator.

For example, in a traditional cable environment (e.g., as illustrated in FIG. 1), a CANH library is utilized by a monitor application, which is a privileged application that is created and downloaded by the cable operator to the set-top box or other system to which services are delivered. After initialization of the CANH library during a pairing process between the set-top box or cable card and a host system, the library is accessible to other applications that wish to make use of it, such as a program guide or navigator application. The various embodiments of the CANH emulator disclosed herein are particularly advantageously used for development of such a Monitor application or navigator.

By way of reference, a Conditional Access Network Handler (CANH) is an OCAP application layer library provided by the conditional access service (CAS) vendor. A CANH typically includes two functional components: 1) a Conditional Access Handler that exposes a standard set of interfaces that abstract proprietary CA functions, and 2) a Network Handler that processes proprietary head-end commands for configuring network and host-specific parameters. This could be, for example, another privileged standalone OCAP application that can expose CANH functionality to other applications, including an Electronic Program Guide or other analogous application.

Figure 2:
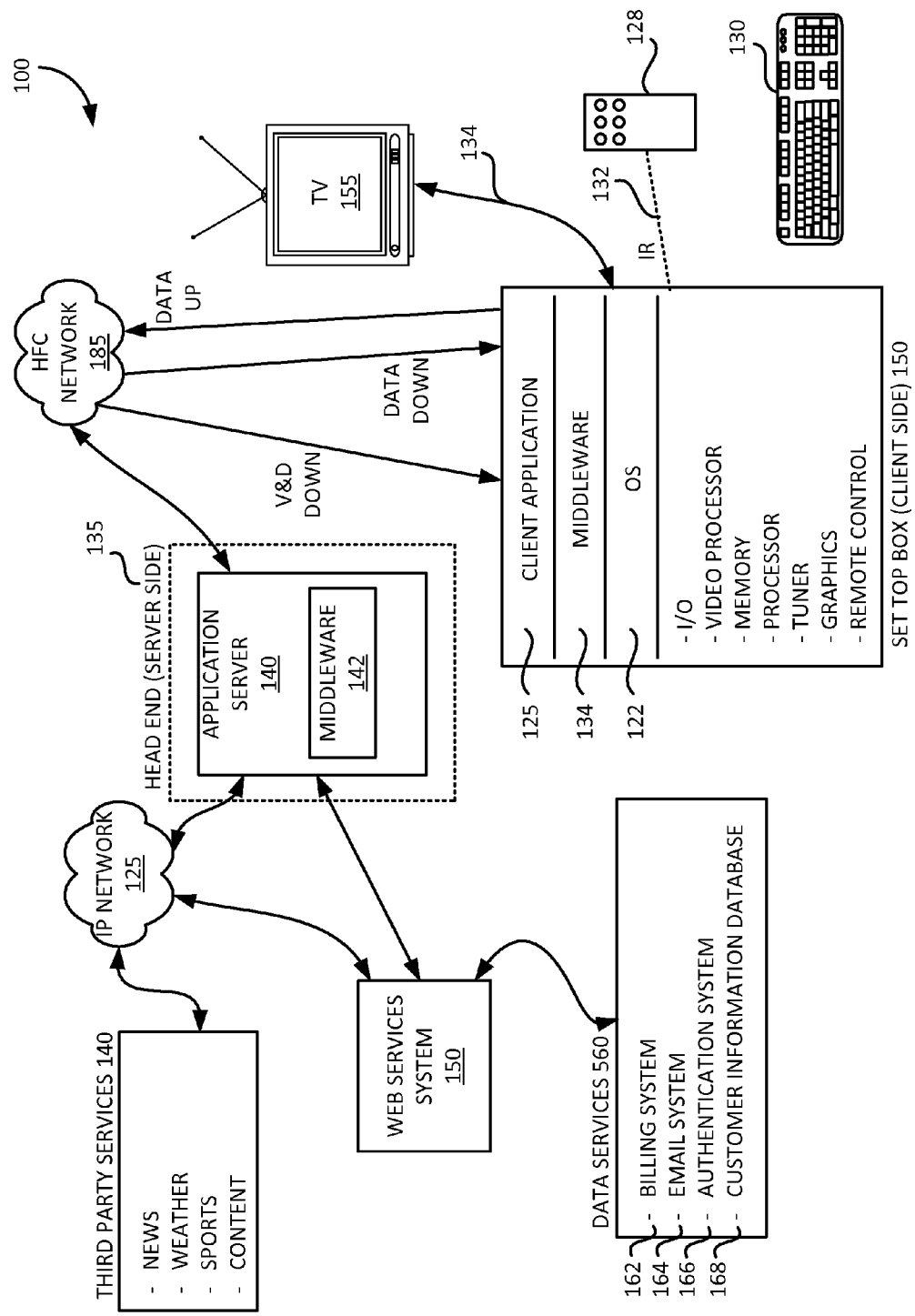
FIG. 2 is a simplified block diagram of a CATV network architecture, in which aspects of the present disclosure can be implemented.

In accordance with the present disclosure, and with reference to FIG. 2, a cable television/services system (hereafter referred to as "CATV") architecture 100 that serves as an exemplary operating environment for embodiments of the invention is described. Referring now to FIG. 2, digital and analog video programming, information content and interactive television services are provided via a hybrid fiber coax (HFC) network 185 to a television set 155 for consumption by a cable television/services system customer. As is known to those skilled in the art, HFC networks 185 combine both optical fiber and coaxial cable lines. Typically, optical fiber runs from the cable head-end 135 to neighborhoods of 500 to 2,000 customers. Coaxial cable runs from the optical fiber feeders to each customer. According to embodiments of the present disclosure, the functionality of the HFC network 185 allows for efficient bidirectional data flow between the client-side set-top box 150 and the server-side application server 140 of the present disclosure.

According to embodiments of the present disclosure, the CATV system 100 is in the form of a distributed client-server computing system for providing video and data flow across the HFC network 185 between server-side services providers (e.g., cable television/services providers) via a server-side (backend) head-end 135 and a client-side customer via a client-side set-top box (STB) functionally connected to a customer receiving device, such as the television set 155. As is understood by those skilled in the art, modern CATV systems 100 may provide a variety of services across the HFC network 185 including traditional digital and analog video programming, telephone services, high speed Internet access, video-on-demand, and information services.

On the client side of the CATV system 500, digital and analog video programming and digital and analog data are provided to the customer television set 155 via the set-top box (STB) 150. Interactive television services that allow a customer to input data to the CATV system 100 likewise are provided by the STB 150. As illustrated in FIG. 2, the STB 150 is a multipurpose computing device having a computer processor, memory and an input/output mechanism. The input/output mechanism of a STB 150 receives input from server-side processes via the HFC network 185 and from customers via input devices such as the remote control device 128 and the keyboard 130. The remote control device 128 and the keyboard 130 may communicate with the STB 150 via a suitable communication transport such as the infrared connection 132. The STB 150 also includes a video processor for processing and providing digital and analog video signaling to the television set 155 via a cable communication transport 134. One or more multi-channel tuners are provided for processing video and data to and from the STB 150 and the server-side head-end system 135, described below.

The STB 150 also includes an operating system 122 for directing the functions of the STB 150 in conjunction with a variety of client applications 125. For example, if a client application 125 requires a news flash from a third-party news source to be displayed on the television 155, the operating system 122 may cause the graphics functionality and video processor of the STB 150, for example, to output the news flash to the television 155 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present disclosure, the middleware layer 124 may include a set of application programming interfaces (API) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 150. According to one embodiment of the present invention, the middleware layer 142 of the server-side application server and the middleware layer 124 of the client-side STB 150 format data passed between the client side and server side according to the Extensible Markup Language (XML). As should be appreciated by those skilled in the art, although some embodiments described in this specification are oriented to middleware installed and executed on a STB 150, alternative embodiments implemented as firmware or as hardware are well within the scope of the present disclosure.

The set-top box 150 passes digital and analog video and data signaling to the television 155 via a one-way communication transport 134. The STB 150 may receive video and data from the server side of the CATV system 100 via the HFC network 185 through a video/data downlink and data via a data downlink. The STB 150 may transmit data from the client side of the CATV system 100 to the server side of the CATV system 100 via the HFC network 185 via one data uplink. The video/data downlink is an "in band" downlink that allows for digital and analog video and data signaling from the server side of the CATV system 100 through the HFC network 185 to the set-top box 150 for use by the STB 150 and for distribution to the television set 155. As is understood by those skilled in the art, the "in band" signaling space operates at a frequency between 54 and 860 megahertz. The signaling space between 54 megahertz and 1 gigahertz and beyond. This signaling space can be, for example, divided into 6 megahertz channels in which may be transmitted a single analog signal or a greater number (e.g., up to ten) digital signals.

The data downlink and the data uplink, illustrated in FIG. 2, between the HFC network 185 and the set-top box 150 comprise "out of band" data links. As is understood by those skilled in the art, the "out of band" frequency range traditionally lies between zero and 54 megahertz, but is not limited to those frequency ranges. According to embodiments of the present disclosure, data flow between the client-side set-top box 150 and the server-side application server 140 is typically passed through the "out of band" data links. Alternatively, an "in band" data carousel may be positioned in an "in band" channel into which a data feed may be processed from the server-side application server 140 through the HFC network 185 to the client-side STB 150. Operation of data transport between components of the CATV system 100, described with reference to FIG. 2, is well known to those skilled in the art.

Referring still to FIG. 2, the head-end 135 of the CATV system 100 is positioned on the server side of the CATV system and includes hardware and software systems responsible for originating and managing content for distributing through the HFC network 185 to client-side STBs 150 for presentation to customers via televisions 155. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 150 via the HFC network 185. As described above with reference to the set-top box 150, the application server 140 includes a middleware layer 142 for processing and preparing data from the head-end of the CATV system 100 for receipt and use by the client-side set-top box 150. For example, the application server 140 via the middleware layer 142 may obtain data from third-party services 140 via the Internet 125 for transmitting to a customer through the HFC network 185 and the set-top box 150. For example, a weather report from a third-party weather service may be downloaded by the application server via the Internet 125. When the application server 140 receives the downloaded weather report, the middleware layer 142 may be utilized to format the weather report for receipt and use by the set-top box 150. According to one embodiment of the present disclosure, data obtained and managed by the middleware layer 142 of the application server 140 is formatted according to the Extensible Markup Language and is passed to the set-top box 150 through the HFC network 185 where the XML-formatted data may be utilized by a client application 125 in concert with the middleware layer 124, as described above. As should be appreciated by those skilled in the art, a variety of third party services data, including news data, weather data, sports data and other information content, may be obtained by the application server 140 via distributed computing environments such as the Internet 125 for provision to customers via the HFC network 185 and the set-top box 150. According to an embodiment of the present disclosure, digital video recording functionality may be located remotely on the head-end (server side) 135 and called upon by a client set-top box 150.

According to embodiments of the present disclosure, the application server 140 obtains customer profile data from services provider data services 160 for preparing a customer profile that may be utilized by the set-top box 150 for tailoring certain content provided to the customer and for pre-populating product/services order forms and customer lead generation forms. As illustrated in FIG. 2, the services provider data services 160 include a number of services operated by the services provider of the CATV system 100 which may include data on a given customer. For example, a billing system 162 may include information such as a customer's name, street address, business identification number, Social Security number, credit history, and information regarding services and products subscribed to by the customer. An electronic mail system 164 may contain information such as electronic mail addresses, high-speed Internet access subscription information and electronic mail usage data. An authentication system 166 may include information such as secure user names and passwords utilized by customers for access to network services.

The customer information database 168 may include general information about customers such as place of employment, business address, business telephone number and demographic information such as age, gender, educational level, and the like. The customer information database may also include information on products and services subscribed to by a customer from her cable services provider. For example, in accordance with embodiments of the present invention, the customer information database may contain data to allow a determination as to whether a particular product or service is already provisioned at a customer service address or whether a work order is pending for a particular product or service provisioning at the customer service address.

The customer information database may also include information that allows for a determination as to whether prerequisites for provisioning a requested product of service are met by a requesting customer. For example, if a customer requests electronic mail services and high speed Internet access is a prerequisite for electronic mail services, the customer information database may be queried to determine whether the required Internet access is provisioned at the requesting customer location or address.

As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols Referring still to FIG. 2, a web services system 150 is illustrated between the application server 140 and the data services 160. According to embodiments of the present disclosure, the web services system 150 serves as a collection point for data requested from each of the disparate data services systems comprising the data services 160. When the application server 140 requires customer profile data from one or more of the data services 160 for preparation or update of a customer profile, the application server 140 passes a data query to the web services system 150. The web services system formulates a data query to each of the available data services systems for obtaining any available data for a given customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer profile data. The customer profile data obtained by the web services system is assembled and is returned to the application server 140 for ultimate processing via the middleware layer 142, as described above.

Referring now to FIG. 2 generally, it is understood that a portion of the systems disclosed as forming the CATV system 100 may be used in the case of development of applications for access on a set-top box 150 or from application server 140. Additionally, one or more of the systems within the CATV system 100 can be represented by simulators or emulators configured to replicate software or hardware system operations within a testing or development environment.

Figure 3:
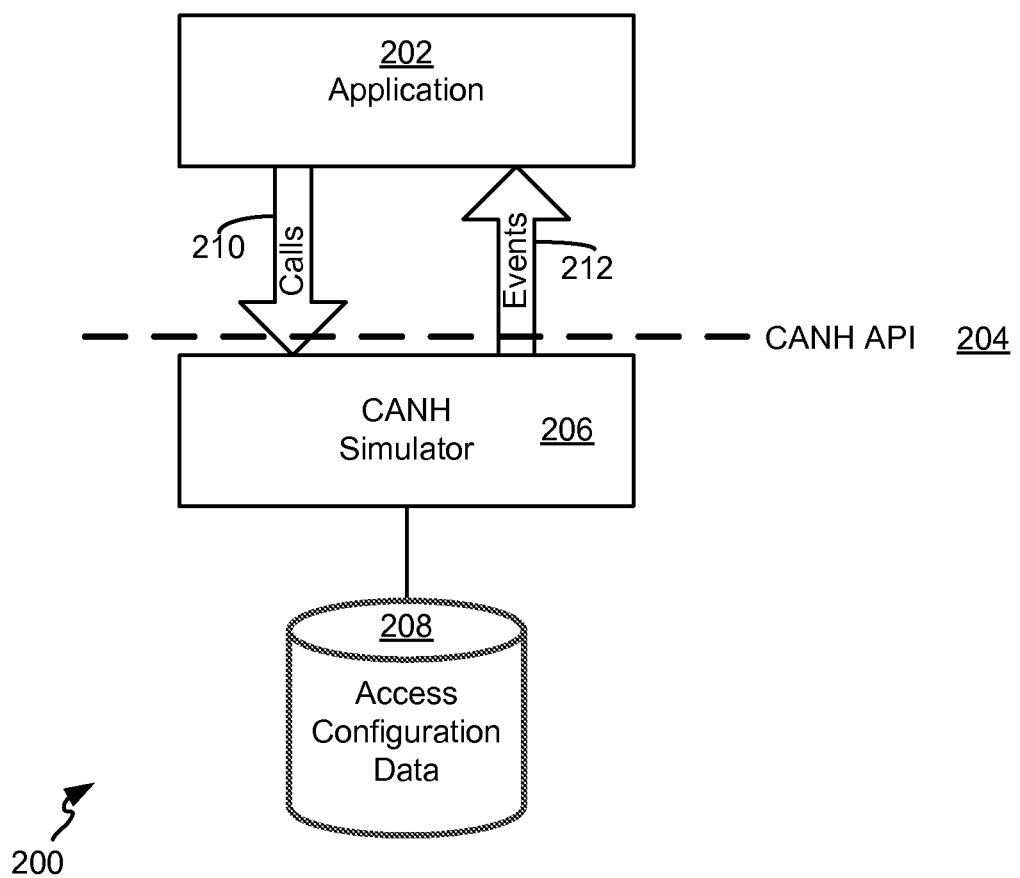
FIG. 3 is a block diagram of a conditional access network handler emulator interfaced to an application, according to a possible embodiment of the present disclosure.

Referring now to FIG. 3, a block diagram of a conditional access network handler (CANH) emulator 200 is shown. The CANH emulator 200 is interfaced to an application 202, which addresses the emulator 200 via CANH API 204.

In certain embodiments, the CANH emulator 200 is configured to imitate functionality of a CANH and associated cable card, as illustrated above in FIG. 1. In comparison to that arrangement, the CANH Emulator 200 is disconnected from any specific cable card or other hardware; rather, it includes a simulation of the cable card entitlement tracking functionality. In some embodiments of the present disclosure, the CANH emulator 200 may run on either of the Tru2Way OCAP emulator and a Cisco 8652 set-top box.

In the embodiment shown, the CANH emulator 200 includes a CANH simulator 206 interfaced to configuration data 208. The CANH simulator 206 receives API calls 210 from an application 202, and returns events 212 analogously to a CANH and physical cable card. In certain embodiments, the CANH simulator 206 includes a library compatible with the configuration data 208, but independent of any physical addressing or dependency upon a physical system or identifier of a physical cable card on which configuration data is traditionally stored. The CANH simulator 206 operates in conjunction with a simulation of the cable card entitlement tracking functionality, as defined in the configuration data. In certain embodiments, the CANH simulator 206 also includes a Conditional Access (CA) handler that exposes a standard set of interfaces that abstract proprietary head-end commands for configuring network and host-specific parameters.

The configuration data 208 can be any of a number of types of information including subscription entitlements for virtual channel identifiers, resource entitlements, pay-per-view entitlements, and cable card physical address data (e.g., MAC address information). Example resource entitlements could include modes for use of the set-top box, such as a "brick" mode, DVR access mode, or some other user defined mode. Pay-per-view entitlements can include, for example, call-ahead pay-per-view event entitlements (OPPV). Other information can be included in the configuration data 208 as well, as necessary.

In certain embodiments, the configuration data 208 defines a channel map for the set-top box, as well as entitlements necessary. In such embodiments, the configuration data can be modified by formatting parameters received from a text file for load by the CANH simulator 206. In alternative embodiments, a further application could be included in the system (not shown) that creates a graphical user interface (GUI) to allow a user to modify a channel map or entitlements. This application could, in such embodiments, operate as a Windows XP application, whose GUI would automatically signal the CANH simulator to indicate the need to re-read all configuration data in case of a change in the configuration data. Other embodiments or methods of editing configuration data used during simulation are possible as well.

In certain embodiments, the configuration data 208 can be updated periodically, to simulate addition or modification of entitlements by a central office. This modification could occur, for example, based on input from a simulation environment, such as that described in connection with FIG. 4, below.

In various embodiments, the application 202 is an application that would interface to a CANH when deployed in a CATV network, such as that illustrated in FIG. 2, above. For example, the application 202 can be a monitor application, a program guide, or a navigator application. Other applications are possible as well. However, in certain embodiments of the present disclosure, the CANH Emulator 200 is useful for the development of such a monitor application or navigator.

In certain embodiments, the application 202 is configured differently from a traditional application, such as illustrated in FIG. 1, above. For example, the application 202 could be configured to detect environments (e.g. the CANH API, etc.) lacking a cable card and using a CANH simulator in place of a traditional CANH and cable card configuration.

The CANH API 204 is a library configured to receive a predefined set of calls and return events in response to those calls. Although the specific calls and events, and API implemented may vary in differing embodiments of the present disclosure, in one embodiment, the CANH API is the CABLELABS® CANH API (OC-SP-CANH-API-IO1-081217), published by Cable Television Laboratories, Inc. of Louisville, Colo., the disclosure of which is hereby incorporated by reference in its entirety.

In some embodiments of the present disclosure, the CANH emulator 200 is used to develop systems other than a monitor application. In such embodiments, a monitor application (e.g. application 202) could be created that is capable of accessing either a traditional CANH and associated cable card, or the CANH simulator 206 and associated configuration data 208. This could allow, for example creation of a development environment for a Navigator application useable on a set-top box.

Figure 4:
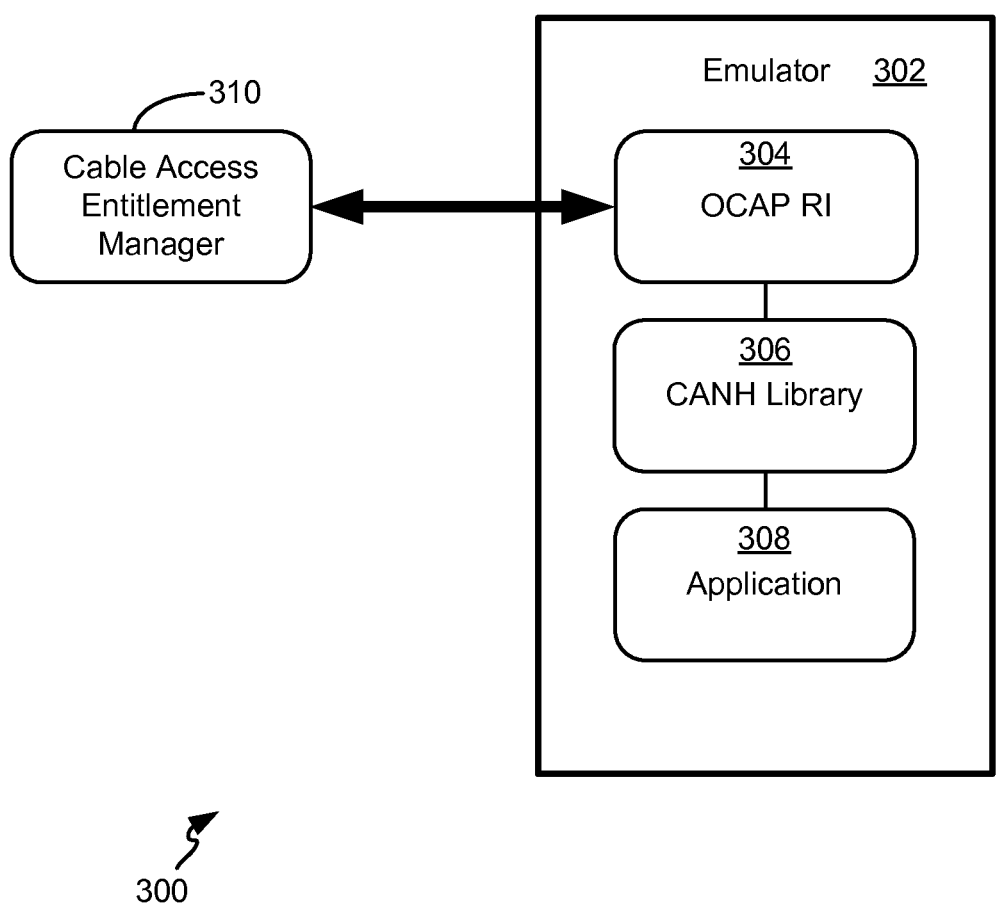
FIG. 4 is a simplified block diagram of an emulation environment in which a conditional access network handler emulator could be used, according to certain embodiments of the present disclosure.

Referring now to FIG. 4, a simplified block diagram of an emulation environment 300 is shown in which a conditional access network handler emulator could be used. The emulation environment provides a location in which applications can be developed for use in a CATV network, such as that illustrated in FIG. 1, above.

In the embodiment shown, the emulation environment 300 includes an emulator 302, which emulates operation of a software and hardware environment for receipt of CATV services, such as a set-top box. In a possible embodiment, the emulator 302 can be a set-top emulator, such as the Tru2Way Workbench system of Cable Television Laboratories, Inc. of Louisville, Colo. Other emulators could be used as well.

The emulator 302 includes a number of emulation components, including an OCAP reference implementation (OCAP RI) emulator 304 interfaced to a CANH Library 306. The CANH Library 306, analogous to CANH emulator 200 of FIG. 2, above, is interfaced to an application under development 308. The CANH Library 306 is capable of responding to calls as defined by the CANH API 304, such as the CABLELABS® CANH API (OC-SP-CANH-API-IO1-081217). For example, the CANH library 308 can allow functional calls querying: whether a particular resource is authorized; whether a resource is freely previewable; and whether an impulse pay-per-view (IPPV) event has been purchased. The CANH library 308 also receives commands regarding monitoring for changes in authorizations, and definitions of target resources. Other events and fields could be included in the CANH library 308 as well.

In the embodiment shown, a cable access entitlement manager (CAEM) 310 resides external to the emulator 302 and interfaces with the OCAP RI 304 and CANH Library 306. The CAEM 310 is typically located in a cable head-end (e.g., head-end 135 of FIG. 2), but which, during simulation, runs as a separate Windows application and communicates to the OCAP RI 304 and CANH Library 306 over a network connection. The CAEM 310 is used to configure and track entitlements and pay-per-view purchases in the emulation environment 300, e.g., emulating a head-end system within a cable services delivery network.

In certain embodiments, the CAEM 310 allows a user to manage differing types of entitlements, including source entitlements, resource entitlements, and impulse pay-per-view (IPPV) entitlements. Other entitlements can be managed as well. Source entitlements determine access to premium content channels, such as HBO; resource entitlements are generic entitlements such as DVR (to authorize access to hard drive storage) or Brick mode (to prevent a user from accessing the set-top box altogether, due to non-payment or other issues). IPPV (impulse pay-per-view) entitlements are associated with specific pay-per-view events, as defined by a channel and a time slot. Video-on-demand entitlements are associated with specific content, but can be provided at a time requested by a subscriber, rather than at a predefined time slot. Application entitlements, including entitlements to access certain functionality on a set-top box or other hardware, or received from another system, can be managed as well. Other subscriber-specific entitlements, such as parental control access control, or entitlements to various services or programming, could be managed by the CAEM 310 as well.

In certain embodiments, the entitlements managed by the CAEM can be received from a billing system, for example in response to purchase of those entitlements by a customer. One example billing system 162 useable for purchasing entitlements is described above in connection with FIG. 2.

As with other development systems, a user can apply the emulator 302 and CAEM 310 to iteratively test and modify an application 308, for example via a process such as the one described below in connection with FIG. 6.

Overall, the combination of components within the emulation environment 300 allows a developer to write and test applications that rely on CA signaling according to published APIs, as well as the functionality defined by the CANH Library 306.

Figure 5:
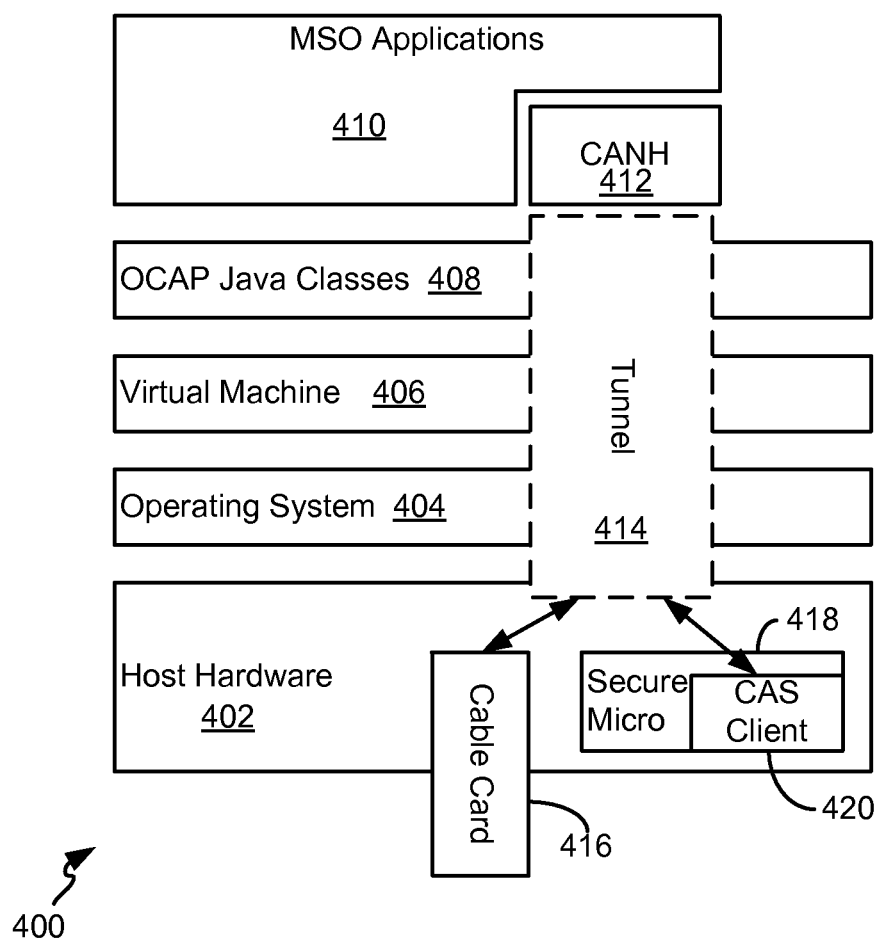
FIG. 5 is a block diagram illustrating the position of a conditional access network handler within an OpenCable Application Platform stack.

Referring now to FIG. 5, a block diagram illustrating the position of a conditional access network handler (CANH) within an OpenCable Application Platform (OCAP) stack 400 is illustrated. The OCAP stack 400 includes a combination of hardware and software systems forming a cable access device, such as a set-top box. The OCAP stack 400 includes host hardware 402, which can be, for example a set-top box such as a Cisco 8652 set-top box. In various embodiments, the host hardware 402 could be any other type of hardware configured to include a downloadable conditional access system (DCAS) manager and CANH.

In certain embodiments, an operating system 404 executes on the host hardware 402, and supports a virtual machine 406 that can be used to host OCAP software classes 408. In the embodiment shown, the operating system 404 supports a Java virtual machine (JVM) hosting OCAP-specific Java classes. In example embodiments, the OCAP software classes 408 include a set of Java classes provided by conditional access vendors to provide a standard way for OCAP applications to interact with either (1) a conditional access system and integrated cable card, (2) an embedded conditional access system in a set-top box or other supply that uses a virtual cable card (e.g., the configuration information 208 of FIG. 2), or (3) a downloadable conditional access system (DCAS).

In the embodiment shown, one or more applications 410 are stored on the host hardware 402, and call the OCAP software classes 408 for execution. These applications can be, for example, a monitor application, a navigator application, or other applications capable of execution in a cable access (e.g., set-top box) environment.

The CANH 412 is located within the OCAP stack 400 adjacent the applications 410, and is accessed by the applications to determine service permissions and to deliver cable services. In certain embodiments, the CANH 412 is a Java package providing such cable access. The CANH 412 communicates via tunnel 414 with an application running on either a cable card 416 or a processor 418 hosting a downloadable conditional access system (downloadable CAS, or DCAS) client 420.

In certain embodiments, the processor 418 is a Secure Micro processor chosen to securely provide conditional access system services. In certain embodiments the processor 418 performs the protocol selected for use by the OCAP stack (e.g., the DCAS protocol), and is also configured to generate and store encryption and security keys, and security secrets, as applicable. The processor 418 is also configured to store client data and client code. The processor 418 is, in such embodiments, programmed and keyed using a key services provider or trusted authority system.

In certain embodiments, a single CANH 412 is instantiated within the OCAP stack 400. In such embodiments, the CANH 412 resides within an Xlet. An Xlet is very similar to a Java applet and is designed to support applications for Digital TV. Xlets include a pause/resume feature typically used in a set-top box environment.

When other applications or Xlets require access to CANH services, those Xlets can use sockets or Inter-Xlet communication (IXC). IXC is a mechanism to enable two OCAP Xlets to communicate, and is explained in further detail in the Multimedia Home Platform (MHP) Specification, which is a Java middleware specification provided by the DVB Project, headquartered in Geneva, Switzerland. MHP/GEM Specification Version 1.2 is incorporated by reference in its entirety. In certain embodiments, the CANH 412 is configured to natively support IXC.

In certain embodiments, the CANH 412 is implemented to include the functionality of the CABLELABS® CANH API (OC-SP-CANH-API-IO1-081217). In such embodiments, the CANH 412 provides implementations of various functions, and interfaces, including the CAHandler, CAAuthorization, and NetHandler interfaces defined in that specification.

Of the applications implementing the CANH, the "CANH server Xlet" refers to an application in which the CANH implementation executes, and "CANH client Xlets" make use of CANH services. In various embodiments, CANH client Xlets communicate with the CANH server Xlet using either IXC, with the interfaces defined in this specification, or using alternative proprietary mechanisms that could make use of socket or alternative IXC interfaces.

In certain embodiments, cable networks that support more than one CA system and/or support both cable card and DCAS CA will need different implementations for a CANH 412. This can be accommodated by either building all relevant CANH implementations into a single CANH server Xlet and choosing the appropriate one at run time within the CANH server Xlet, or by running different CANH server Xlets for each implementation of the CANH 412.

A CANH server Xlet is the Xlet in which the CANH implementation actually executes. There is only one CANH server Xlet running on the Host device. The CANH Server Xlet includes all classes described in this document and included in the CANH interface .jar file. If the CANH implementation .jar file(s) includes additional interfaces, these additional interfaces SHALL also be included in the CANH Server Xlet. CANH implementation code is used only by the CANH server Xlet.

A CANH client Xlet is an Xlet that uses IXC to access CANH services that are provided by the CANH server Xlet. There can be multiple CANH client Xlets on the Host device (e.g., set-top box). CANH client Xlets can communicate with the CANH server Xlet using either IXC or alternative proprietary mechanisms provided by the CANH Server Xlet.

Regarding FIG. 5 generally, it is seen that the OCAP stack 400 that requires simulation would include a CANH capable of simulating interaction with either a cable card or DCAS access system; in various embodiment of the present disclosure, the CANH emulators described herein provide various communicative functionality allowing a user to define resource entitlements to be associated with a particular virtual cable card or DCAS system, e.g., within the emulation environment 300 of FIG. 4, above.

Figure 6:
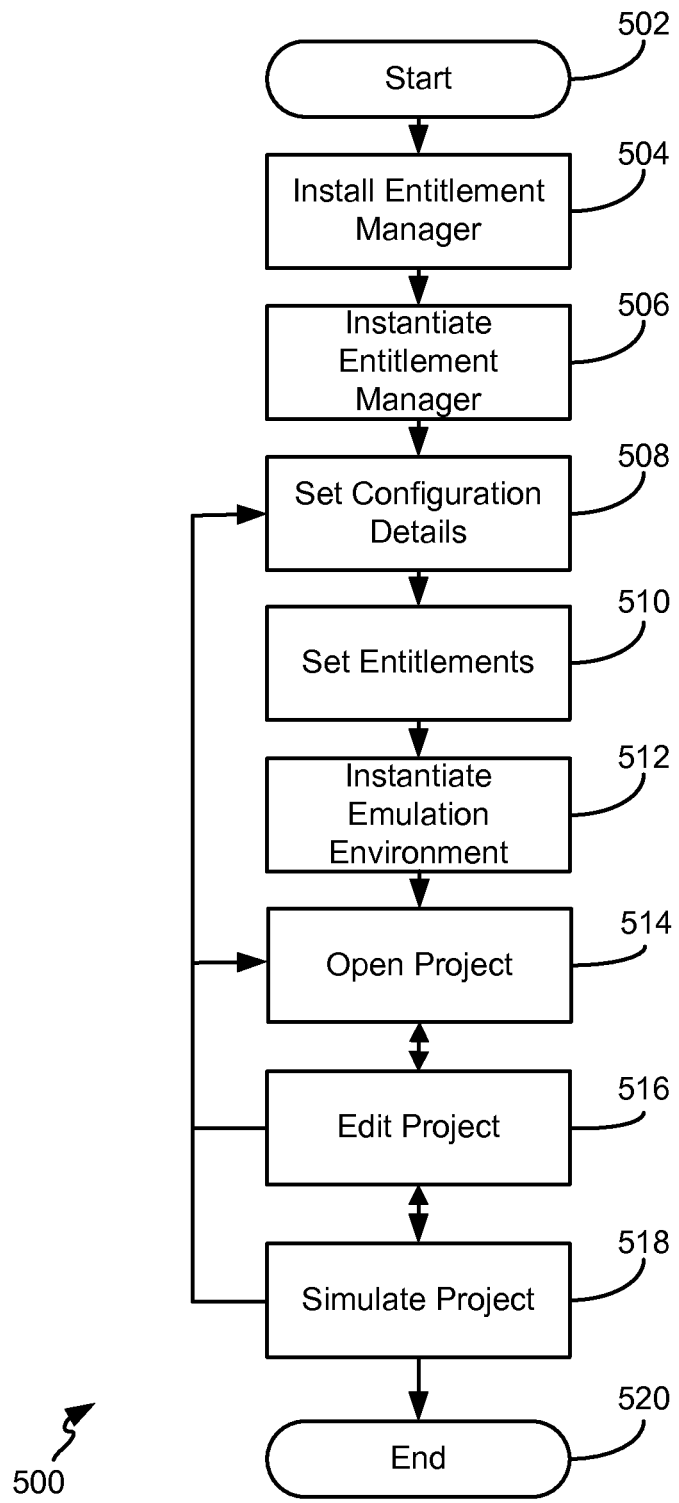
FIG. 6 is a flowchart of a method for developing an application using a conditional access network handler emulator, according to a possible embodiment of the present disclosure.

Referring now generally to FIG. 6, a method 600 for use of a CANH emulator is disclosed, for example, for creating and testing applications typically associated with specific hardware environments (e.g., requiring a cable card). Generally, the method 600 can be performed by a user (e.g., an application developer) of a software emulation system, such as the Tru2Way OCAP emulation environment mentioned above. The method 600 is instantiated at a start operation 502, which corresponds to initial use of the Tru2Way emulator environment for application development and editing.

An entitlement manager installation operation 504 installs various components on a local system configured to emulate operation of host hardware (e.g., a set-top box) within a conditional access OCAP network, as illustrated in FIG. 2, above. For example, the entitlement manager installation operation 504 can install a CANH emulator within an emulation environment (e.g., the Tru2Way emulation system), such as the CANH 412 as illustrated in FIG. 4, above. An entitlement manager instantiation operation 506 opens the entitlement manager, allowing use in connection with an emulator to develop an application for use.

A configuration operation 508 allows a user to configure various settings for development of an application, including creating a set of "canned" configuration data useable for conditional access. This can include, for example, the address/location of the emulator, the address or simulated address of the configuration data representing a cable card, as well as other optional selections, such as whether to designate a particular communication port or allow impulse pay-per-view purchases. The configuration operation 508 allows the user to simulate a "head-end" of a typical cable network configured to deliver services to host hardware operating the application under development.

An entitlements operation 510 allows a user to define one or more entitlements associated with a simulated CANH within an emulation environment. In certain embodiments, each of a number of different types of entitlements could be selected and defined by the user. For example, the entitlements operation 510 can allow a user to define or delete source entitlements, resource entitlements, or IPPV events. Regarding source entitlements, the entitlements operation 510 can allow a user to add a particular source to a list of entitlements, including a description of the source, its identifier as used in the application to be tested/developed, and a source identifier. The user can also select or deselect the entitlement once defined, allowing for quick deactivation of particular source entitlements. Similarly, the entitlements operation 510 allows a user to define resource entitlements, including guide data or other information authorizing particular functionality to be activated within a hardware host.

Regarding IPPV events, a user is capable of defining or removing such events, and for each event specific information can be included, such as a description of the entitlement, identifiers of the entitlement and its source, authorizations, as well as preview and subscription information for one-time, or recurring events.

For each of these entitlements, the entitlements operation 510 allows a user to create, modify, or delete the entitlements as desired, to allow for coordination with an application under development that can be tested and developed within an emulation environment (e.g., emulation environment 300 of FIG. 4).

A simulator instantiation operation 512 instantiates the emulation environment if not already open. An open project operation 514 allows a user to select and open a particular application under development (again, if not already selected). The user can edit the operation as desired (as illustrated in edit project operation 516). Once open and edited as desired, a user can view the application and record results of its operation within the emulation environment simulate project operation 518.

A user can iteratively edit and simulate operation of an application as desired within the emulation environment, thereby repeating operations 514-518. Additionally, optionally while editing/simulating the project, that user may elect to iteratively return to the configuration operation to set or edit one or more items in the configuration data during development of the application. An end operation 520 corresponds to completed editing and simulation of an application using the emulation environment and CANH emulator, for example when a user wishes to port the application for use on actual host hardware (e.g., a set top box including a cable card).

In addition to the typical operations illustrated in FIG. 6, above, in certain embodiments the CANH emulator described herein can be used in other ways. For example, a CANH emulator can simulate sending a network message from the head-end for use in your application. In certain embodiments, the network message is a series of hexadecimal bytes, the content of which is proprietary for each set-top box. Other operations are possible as well.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the overall concept of the present disclosure.

It will be apparent to those skilled in the art that various modifications or variations may be made in the present disclosure without departing from the scope or spirit of the invention. Other embodiments of the disclosure will be apparent to those skilled in the art from consideration of the specification and practice of the invention disclosed herein.

The above specification, examples and data provide a complete description of the manufacture and use of the composition of the invention. Since many embodiments can be made without departing from the spirit and scope of the invention, the invention resides in the claims hereinafter appended.

The invention claimed is:

1. A conditional access network handler emulator system comprising:
 a conditional access network handler simulator executable on at least one of a cable access device or a computing system emulating a cable access device, the conditional access network handler simulator addressable by one or more applications within an emulation environment executing on an application server and exposing an application programming interface to one or more applications under development within the emulation environment; and a library of conditional access configuration data accessible to a conditional access network handler simulator, the configuration data unassociated with a physical cable card and defining a plurality of modes of simulated operation of a cable access device, the plurality of modes including a brick mode and a DVR access mode;

wherein the conditional access network handler simulator hosts simulated execution by the one or more applications, including at least one conditional access application, in the absence of a physical cable card.

2. The conditional access network handler emulator system of claim 1, wherein the library of conditional access configuration data includes data selected from the group consisting of:
subscription entitlements for virtual channel identifiers;
resource entitlements;
parental control access control information;
application entitlements;
application-specific resource entitlements;
subscriber-specific entitlements;
video-on-demand entitlements;
pay-per-view entitlements; and
cable card physical address data.

3. The conditional access network handler emulator system of claim 2, wherein the cable card physical address data includes a media access control (MAC) address.

4. The conditional access network handler emulator system of claim 1, wherein at least one of the one or more applications is a monitor application configured to execute on host hardware.

5. The conditional access network handler emulator system of claim 4, wherein the host hardware comprises a set-top box.

6. The conditional access network handler emulator system of claim 5, wherein the library of conditional access configuration data defines a brick mode for the set-top box.

7. A conditional access cable programming application development environment comprising:
a conditional access network handler emulator system executing on an application server including:
an application under development;
a cable access entitlement manager;
an emulation environment including a conditional access network handler emulator system addressable by the application, the emulation environment capable of loading the application and linking the application to the conditional access network handler emulator system and the cable access entitlement manager in the absence of a physical cable card;
wherein the conditional access network handler emulator system includes a library of conditional access configuration data accessible to a conditional access network handler simulator exposing an application programming interface to the application under development, the configuration data unassociated with any physical cable card;
wherein the library of conditional access configuration data defines a plurality of modes of simulated operation of a cable access device, the plurality of modes including a brick mode and a DVR access mode.

8. The conditional access cable programming application development environment of claim 7, wherein the application under development is a monitor application.

9. The conditional access cable programming application development environment of claim 7, wherein the application under development is a navigator application capable of execution on a set-top box.

10. The conditional access cable programming application development environment of claim 7, wherein the conditional access network handler emulator allows a user to define one or more entitlements in the configuration data.

11. The conditional access cable programming application development environment of claim 7, wherein the library of conditional access configuration data includes data selected from the group consisting of:
subscription entitlements for virtual channel identifiers;
resource entitlements;
parental control access control information;
application entitlements;
application-specific resource entitlements;
subscriber-specific entitlements;
video-on-demand entitlements;
pay-per-view entitlements; and
cable card physical address data.

12. A method of testing an application intended for use on host hardware configured to deliver conditional access cable programming, the method comprising:
instantiating an emulation environment including a conditional access network handler emulator on an application server, the conditional access network handler emulator exposing an application programming interface to one or more applications under development within the emulation environment, the conditional access network handler emulator including a library of conditional access configuration data unassociated with a physical cable card and defining a plurality of modes of simulated operation of a cable access device, the plurality of modes including a brick mode and a DVR access mode;
configuring connection information in an entitlement manager to operate in conjunction with an emulation environment, the entitlement manager simulating a head-end of a cable services delivery network;
loading a conditional access application under development in the emulation environment, the conditional access application configured to address the access network handler emulator to determine access rights to services in the cable services delivery network in the absence of a physical cable card; and
simulating operation of the conditional access application in the absence of a cable card.

13. The method of claim 12, further comprising linking the conditional access application to the conditional access network handler emulator system.

14. The method of claim 12, further comprising enabling one or more entitlements in the entitlement manager.

15. The method of claim 14, wherein an entitlement of the one or more entitlements are received by the entitlement manager from a billing system.

16. The method of claim 14, wherein the one or more entitlements are selected from a group of entitlements consisting of:
subscription entitlements for virtual channel identifiers;
parental control access control information;
application entitlements;
application-specific resource entitlements;
subscriber-specific entitlements;
video-on-demand entitlements;
resource entitlements; and
pay-per-view entitlements.

17. The method of claim 16, wherein enabling one or more entitlements in the entitlement manager adds the entitlements to the conditional access configuration data.

18. The method of claim 12, further comprising initializing the conditional access network handler emulator from the conditional access application.

19. The method of claim 12, wherein the conditional access application is a monitor application.

20. The method of claim 16, wherein the conditional access application accesses the configuration data via the conditional access network handler emulator to determine rights to an entitlement from among the one or more entitlements.

21. The method of claim 12, further comprising defining cable card physical address data in the configuration data.

22. The method of claim 12, further comprising simulating transmission of a message from a head-end via the entitlement manager.

\* \* \* \* \*